US006637450B2

(12) United States Patent
Huang

(10) Patent No.: US 6,637,450 B2
(45) Date of Patent: Oct. 28, 2003

(54) PRESSURE VALVE DEVICE FOR A GAS PRESSURE CARTRIDGE

(76) Inventor: Hai-Lung Huang, No. 22, Lane 308, Sec. 3, Tung Men Rd., Tainan (TW)

( * ) Notice: Subject to any disclaimer, the term of this patent is extended or adjusted under 35 U.S.C. 154(b) by 32 days.

(21) Appl. No.: 09/988,866

(22) Filed: Nov. 19, 2001

(65) Prior Publication Data

US 2003/0094195 A1 May 22, 2003

(51) Int. Cl.[7] .......................... F16K 17/40; F41B 11/32

(52) U.S. Cl. .................... 137/68.3; 137/68.19; 124/74; 222/175

(58) Field of Search .......................... 137/68.11, 68.19, 137/68.29, 68.3; 124/53.5, 71, 72, 73, 74, 80; 222/175

(56) References Cited

U.S. PATENT DOCUMENTS 2,725,048 A * 11/1955 Koogle ........................ 124/71
4,344,410 A * 8/1982 Curran ........................ 124/80
5,282,454 A * 2/1994 Bell et al. ..................... 124/49
5,361,524 A * 11/1994 Karkau et al. ................ 124/74
5,363,834 A * 11/1994 Stuchlik ...................... 124/76
5,404,863 A * 4/1995 Poor ........................... 124/74
5,407,096 A * 4/1995 Smith ......................... 222/175
5,755,213 A * 5/1998 Gardner et al. ............... 124/73
5,839,422 A * 11/1998 Ferris ........................ 124/53.5
6,029,645 A * 2/2000 Wonisch et al. .............. 124/74

* cited by examiner

*Primary Examiner*—Michael Powell Buiz
*Assistant Examiner*—Ramesh Krishnamurthy
(74) *Attorney, Agent, or Firm*—William E. Pelton, Esq.

(57) ABSTRACT

A pressure valve device for a gas pressure cartridge has a pressure valve, a container connected to the pressure valve and a clip connected to the pressure valve. The pressure valve has an exhaust port and a gas inlet with a crewing portion. The container in which a gas cartridge is retained has a screwing opening screwed onto the screwing portion of the gas inlet. When the container is screwed onto the screwing portion, gas from the gas cartridge is input to the gas inlet. The pressure valve outputs a fixed gas pressure through the exhaust port into the compressed air gun. In addition, the clip on the pressure valve makes carrying the pressure valve device on a belt or the like easy.

6 Claims, 5 Drawing Sheets

PRESSURE VALVE DEVICE FOR A GAS PRESSURE CARTRIDGE

BACKGROUND OF THE INVENTION

1. Field of the Invention

The present invention relates to a pressure valve device for a gas pressure cartridge and more particularly to a pressure valve that is adapted to connect to a small gas pressure cartridge and that is portable.

2. Description of Related Art

Compressed gas guns and rifles have become popular because of their not needing explosive charges to be incorporated in bullets used, and being quieter in use than the conventional firearm. Furthermore, mock battles between rival groups have become a popular staged event and are only possible because of the substantially harmless nature of the guns and the subsequent lack of fire arm regulations.

In practice, the sources of the compressed gas, such as Carbon Dioxide gas and coolant, are often applied in the gun and the pressure of the $CO_2$ gas, which is made by the $CO_2$ changing from liquid to gas, is about 60 kg/cm$^3$. The gas pressure is sufficient to shoot the bullets from the gun to a target. However, the gas pressure is often found to be too high for safe use, and this has resulted in serious accidents and injuries to users of such weapons. The other source of the pressure for such a gun is coolant that offers low pressure but the coolant always freezes in the low temperature environment like the north of the Europe, and then the guns is unreliable or worse, unworkable.

A pressure valve device has been developed to decrease the gas pressure supplied to the gun. That is, the pressure to the gun is reduced to about 10 kg/cm$^3$ from the high pressure of the gas $CO_2$ by the pressure valve device and thus the valve-fitted gun is much safer to use than the high pressure one. Furthermore, the Carbon Dioxide powered gun does not freeze in the cold temperature environment, and thus has reliable pressure.

Referring to the FIG. 5, a pressure valve device (40) comprises a body (41), a gas inlet (45), an exhaust port (44), a safety valve (43) and a connector (50). The gas inlet (45) formed the bottom of the body (41) connects to a first end (51) of the connector (50). A second end (52) of the connector (50) connects to an opening (61) defined in a big gas cartridge (60). A PU hose (46) connects the exhaust port (44) with a gun (not shown). When the big gas cartridge (60) connects to the pressure valve device (40), the gas escapes from the big cartridge (60) to the gas inlet (45) of the pressure valve device (40). A fixed pressure of the gas is controlled by the pressure valve device (40), and then the gas outputs through the exhaust port (44) and the PU hose (46) to the gun. The gun uses the pressure valve device (40) to decrease the gas pressure, but the big gas cartridge (60) is too heavy and cumbersome.

The gun with the pressure valve device and the big gas cartridge is too heavy and cumbersome to be an effective weapon in mock battles. Therefore the pressure valve device should be improved to solve the problem of lack of portability.

SUMMARY OF THE INVENTION

The main objective of the present invention is to provide a portable pressure valve device.

Another objective of the present invention is to provide a convenient operation for assembling a small gas cartridge with the pressure valve device.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
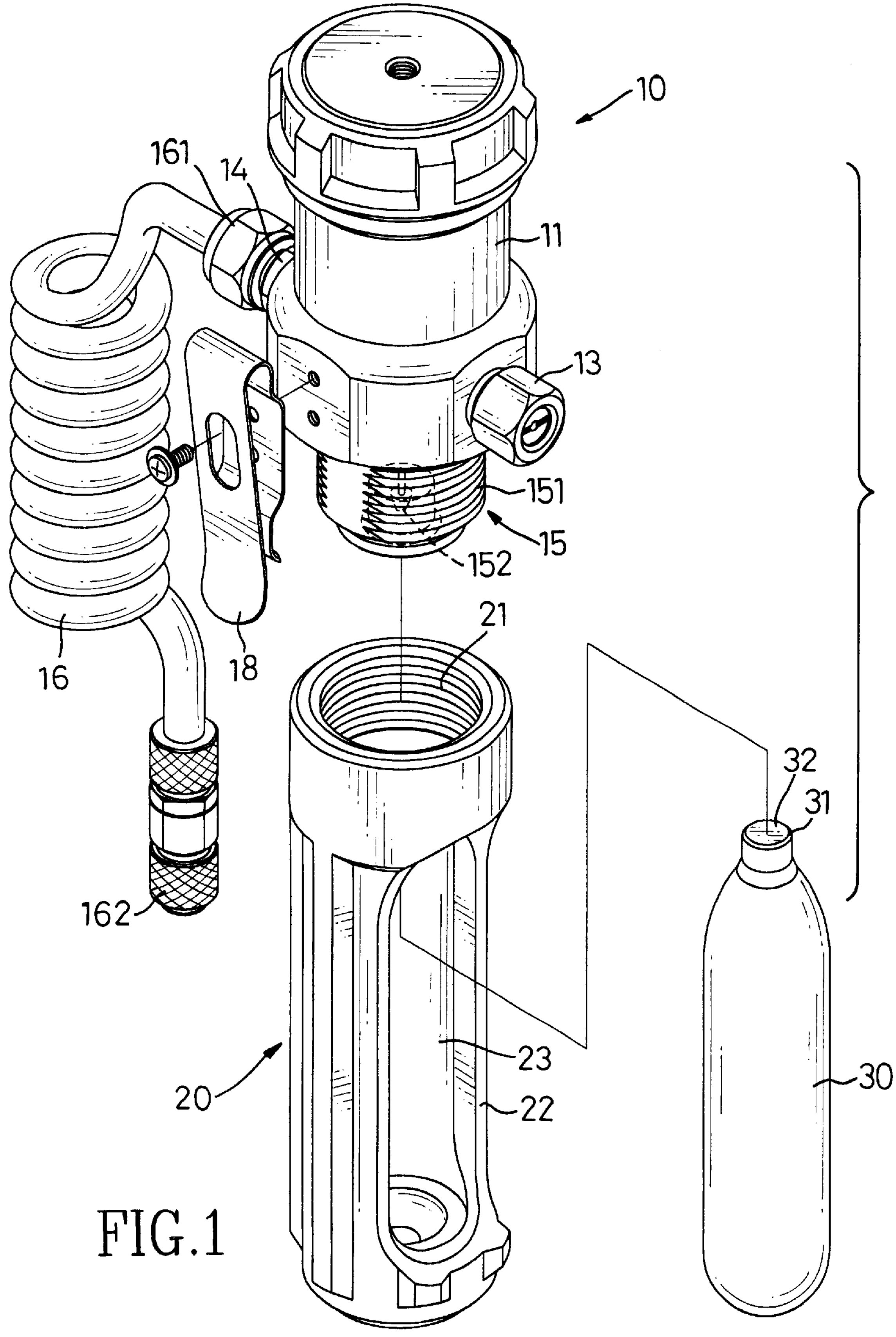
FIG. 1 is an exploded view of a first embodiment of a pressure valve device in accordance with the present invention.

With reference to FIG. 1, a first embodiment of a pressure valve device comprises a pressure valve (10) and a container (20) in which a gas cartridge (30) is retained.

The pressure valve (10) includes a body (11), a gas inlet (15), an exhaust port (14), and a safety valve (13). The gas inlet (15) comprises a hollow screwing portion (151) formed on a bottom of the body (11) and a needle cannula (152) retained in the screwing portion (151). An outer thread is formed around the outer hollow screwing portion (151). The exhaust port (14) formed on a side of the body (11) outputs a fixed gas pressure to a compressed gas gun (not shown) by a PU hose (16). The PU hose (16) has two connectors (161)(162), one connector (161) secures to the exhaust port (14) and the other connector (162) secures to the gun (not shown). A clip (18) is disposed on a side of the body (11) to fix on a belted waistband of the user whereby the pressure valve (10) can be conveniently carried in a hands-free manner. The safety valve (13) is to adjust a fixed gas pressure outputted from the exhaust port (14).

The container (20) has a chamber (23), a screwing opening (21) and a slot (22) communicated with the screwing opening (21) and the chamber (23). The container (20) is cylinder-shaped and the chamber (23) is defined inside of the container (20). The slot (22) is defined in a side of the container (20). The screwing opening (21) corresponds to the screwing portion (151) of the gas inlet (15) and is defined in a top of the container (20). That is, for moving the small gas cartridge (30) in the container (20), a moving mean comprises the screwing opening (21) and the screwing portion (151). The chamber (23) is adapted to retain the small gas cartridge (30).

Figure 2:
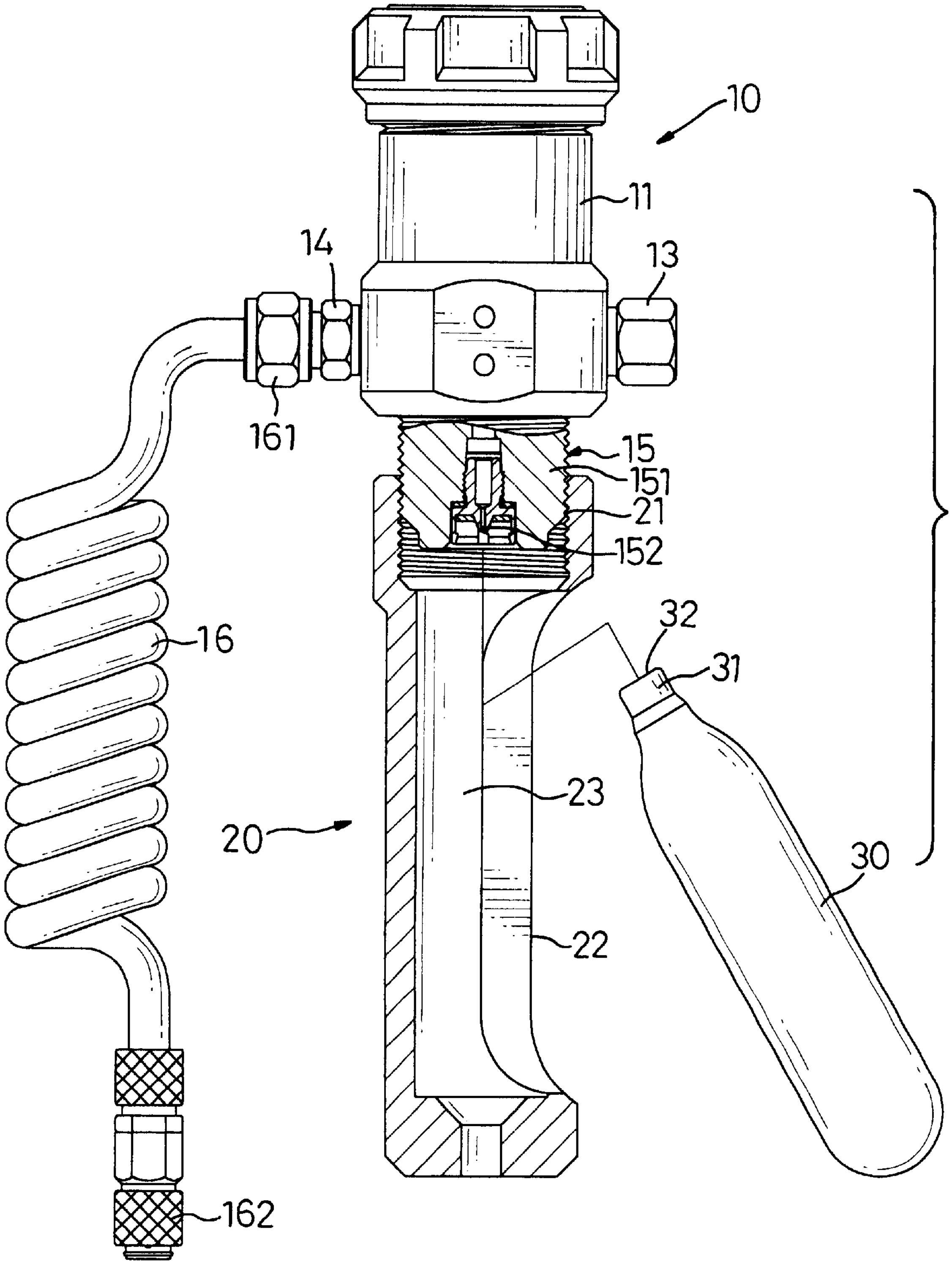
FIG. 2 is a first schematic view of the first embodiment of the pressure valve device in accordance with the present invention.

Referring to FIG. 2, the schematic of the first embodiment is shown wherein the pressure valve (10), the container (20) and the gas cartridge (30) are combined to assemble the pressure valve device. Firstly, the container (20) connects to the screwing portion (151) of the pressure valve (10) by the screwing opening (21) but the screwing opening (21) temporarily does not screw to a top of the screwing portion (151) completely. That is, a space of the chamber (23) of the container (20) has to be able to retain the cartridge (30). Secondly, the gas cartridge (30) is obliquely inserted into chamber (23) via the slot (22) such that an opening (31) of the gas cartridge (30) sealed by a film (32) corresponds to the screwing opening (21). At this point the cartridge (30) is retained in the container (23) and there is a distance between the film (31) of the opening (31) and the needle cannula (152).

Figure 3:
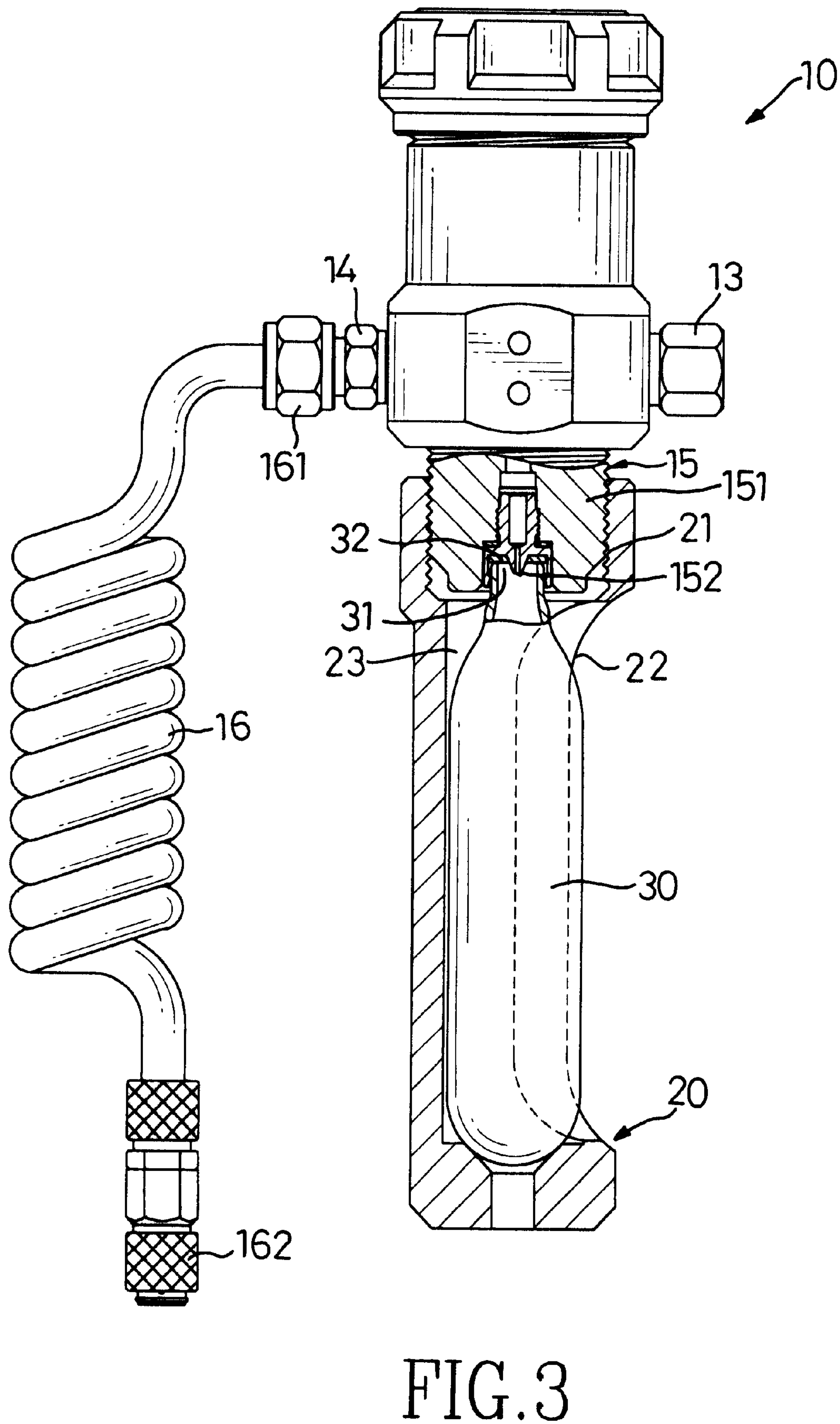
FIG. 3 is a partial cross section view of the first embodiment of the pressure valve device in accordance with the present invention.

With reference to FIG. 3, the container (20) screws upwardly until the screwing opening (21) screws to the top of the screwing portion (151) of the gas inlet (15). Meanwhile the needle cannula (152) pierces the film (32) of the opening (31) of the cartridge (30), and then the gas inputs into pressure valve (10) through the needle cannula (152). When the gas inputs into the pressure valve (10), the gas pressure is decreased by the pressure valve (10). That is, the exhaust port (14) of the pressure valve (10) outputs the fixed gas pressure to the gun (not shown).

Figure 4:
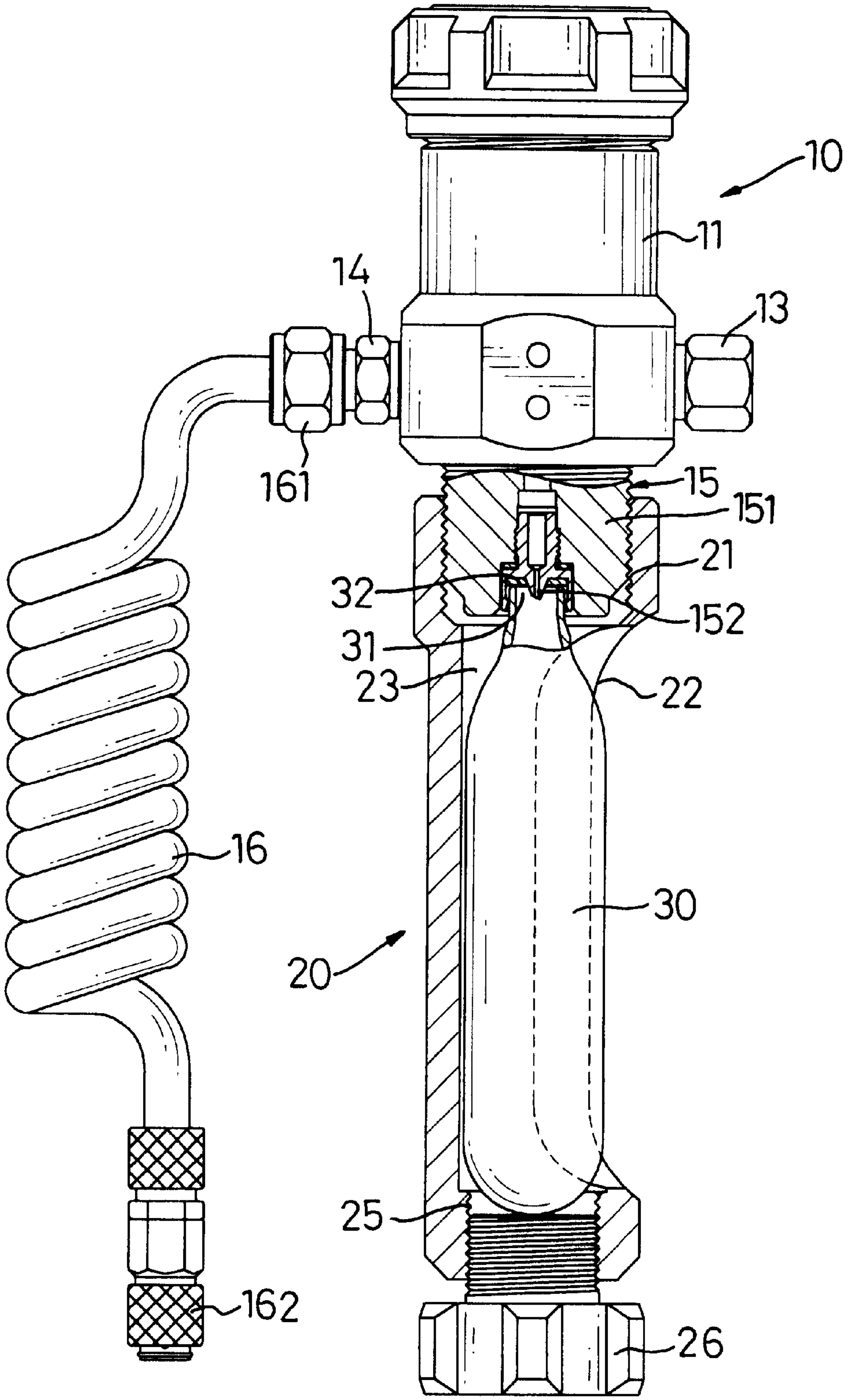
FIG. 4 is a partial cross section view of the second embodiment of the pressure valve device in accordance with the present invention.
Figure 5:
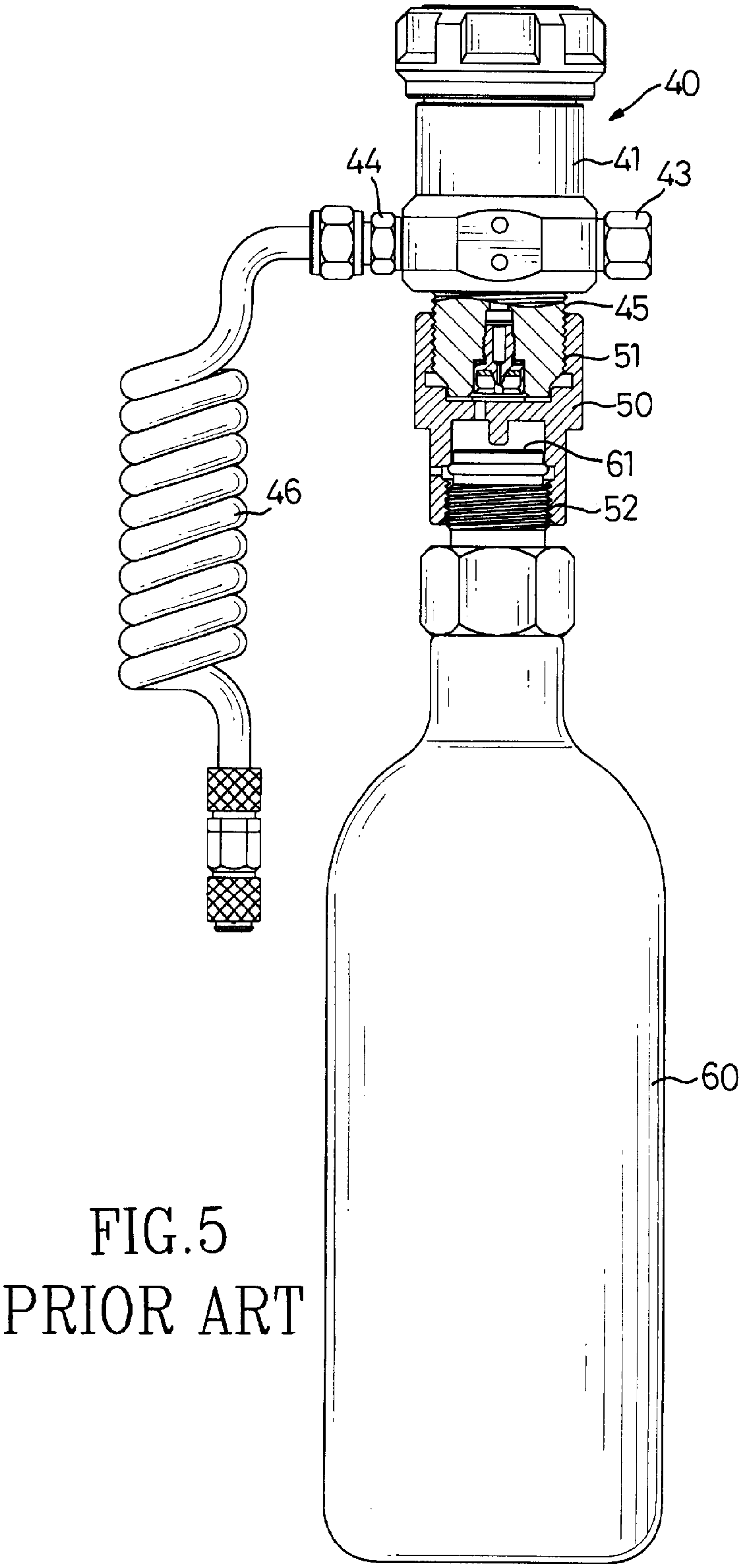
FIG.5 PRIOR ART
FIG. 5 is a partial cross section view of a conventional pressure valve device with a big gas cartridge.

Although in the first embodiment the container (20) screws the cartridge (30) to the pressure valve (10) by the screwing opening (21), it is to be appreciated that other configurations are practical, as shown in FIG. 4, wherein the container (20) further has a screwing hole (25) defined in a bottom of the container (20) and a screw (26). The screw (26) follows threads of the screwing hole (25) to move the cartridge (30) in the container (20) until the film (32) is pierced by the needle cannula (152). That is the moving mean comprises the screwing hole (25) and the screw (26).

As per the above description, the present invention has the following advantages:

1. High mobility. The pressure valve device adapts to retain the lightweight small cartridge, and the clip formed on the pressure valve device enables the device to be easily carried.
2. Simple operation. The user just adjusts the distance between the container and the pressure valve by screwing the container, whereby the small gas cartridge is easily fitted in or removed from the pressure valve device.

Although the present invention has been explained in relation to its preferred embodiment, it is to be understood that many other possible modifications and variations can be made without departing from the spirit and scope of the invention as hereinafter claimed.

What is claimed is:

1. A pressure valve device for a gas pressure cartridge, comprising:

a pressure valve comprising:
- a body;
- a gas inlet formed on a bottom of the body;
- an exhaust port formed on a side of the body for outputting a fixed gas pressure; and a container connected to the gas inlet for retaining a gas cartridge in the container and having a moving means for moving the gas cartridge in the container, wherein the container comprises:
- a chamber defined in the container for retaining the gas cartridge;
- a slot defined in a side of the container and communicating with the chamber to allow the gas cartridge to be inserted into the chamber; and
- an opening defined in a top of the container, said opening corresponding to said gas inlet for connecting the container to the pressure valve, said gas inlet further comprising a hollow screwing portion and a needle cannula retained in the screwing portion for opening the gas cartridge.

2. The pressure valve device as claimed in claim 1, wherein the moving means comprises the opening in the container and the gas inlet, wherein the opening is a screwing opening screwed onto the screwing portion of the gas inlet for moving the gas cartridge in the chamber during screwing of the opening of the container onto the gas inlet.

3. The pressure valve device as claimed in claim 1, wherein the moving means comprises a screwing hole defined in a bottom of the container and a screw corresponded to the screwing hole for moving the gas cartridge in the container from a first position wherein the gas cartridge is not pierced to a second position wherein the gas cartridge is pierced to release contents thereof.

4. The pressure valve device as claimed in claim 1, wherein the pressure valve further comprises a clip connected to a side of the pressure valve for easy portability.

5. The pressure valve device as claimed in claim 2, wherein the pressure valve further comprises a clip connected to a side of the pressure valve for easy portability.

6. The pressure valve device as claimed in claim 3, wherein the pressure valve further comprises a clip connected to a side of the pressure valve for easy portability.

* * * * *